3,403,995
PROCESS FOR PRODUCING CONCENTRATES OF HIGH MANGANESE CONTENT

Sándor Fekete, Budapest, and Albert Horváth, József Sever, and Jenő Szaló, Urkut, Hungary, assignors to Metalimpex Acel- es Femkulkereskedelmi Vallalat, Budapest, Hungary
No Drawing. Filed Jan. 27, 1964, Ser. No. 340,539
1 Claim. (Cl. 75—115)

ABSTRACT OF THE DISCLOSURE

Manganese is recovered in high concentration by establishing an aqueous slurry containing substantial quantities both of finely divided manganese carbonate ores and also of mineral raw material containing manganese oxide. The slurry is contacted with gas containing 0.2 to 5% by volume of sulfur dioxide to produce a manganous sulfate solution. The solution and the barren content of the slurry are separated from each other, and the manganese content is then recovered from the solution. It is the conjoint presence of the manganese oxide and manganese carbonate that permits recovery from the manganese carbonate.

---

This invention relates to a process for preparing concentrates of high manganese content, electrolytic manganese, synthetic manganese dioxide, and manganese salts from starting materials containing manganese carbonate ores together with manganese oxide ores, dressing middle products and/or dressing barrens.

It is known that the manganese ores recovered from natural manganese oxide and carbonate ore occurrences art apt for industrial use only after dressing. While dressing, a large amount of dressing barren containing a considerable amount of manganese is obtained, this barren being not usable for industrial purposes, and even the treatment of the barren supplies of manganese mines or dressing works adds extra expense.

It is also known that the industrial treating and dressing in mechanical or physical ways of the manganese carbonate ores containing clay minerals of sedimentary origin and of a very fine grain structure has not heretofore been performed in an economical way. Accordingly, the manganese carbonate ores can be used in raw state and in small amounts exclusively as the additive agents of blast furnaces, although, due to the vast deposits throughout the world, the working up of ores of this type to manganese concentrates would be very advantageous.

The object of the invention is to provide a hydrometallurgical process, by the aid of which the manganese content of starting materials containing manganese carbonate ores together with manganese oxide ores can be economically recovered with a purity satisfactory even from an industrial point of view.

The basis of the invention is the recognition that the manganese content of starting materials containing manganese carbonate ores together with manganese oxide ores can be economically recovered with the aid of gases containing sulfur dioxide in only a small concentration, and practically the total sulfur-dioxide content of the gases can be converted to sulfate and sulfuric acid, because in this way other sulfur compounds, e.g. dithionic acid and dithionates which, in the case of the processes known till now, considerably reduced the degree of utilization of the sulfur dioxide, are not produced. Moreover, the sulfuric acid obtained in this way can be used for dissolving the manganese-carbonate content of the ores.

The invention is a process for producing concentrates of high manganese content, electrolytic manganese, synthetic manganese dioxide, and manganese salts from starting materials containing manganese carbonate ores together with manganese oxide ores, dressing middle products and/or dressing barrens, in which the starting materials are wet ground, the obtained slurry is reacted with waste gases containing sulful dioxide in an amount of 0.2 to 5% by volume, and/or with an air mixture containing sulfur dioxide in an amount of 0.2 to 5% by volume, in equipment ensuring contact over large surfaces, and the manganese content of the obtained manganous-sulfate solution is recovered.

When employing the process according to the invention, from the ores used as starting material 90 to 95% of the manganese content of the ores is dissolved out in the form of manganous-sulfate solution containing impurities in only a slight amount. The solution containing manganous sulfate can be advantageously separated from the leached ore in clarifying or filtering apparatuses or in centrifuges.

Under the influence of the oxygen content of gases employed in compliance with the process according to the invention, the sulfur dioxide is partly oxidized to sulfuric acid by the tetravalent manganese ions contained in the oxide ore, and the sulfuric acid thus formed dissolves the manganous carbonate in the form of manganous sulfate, essentially according to the following equations:

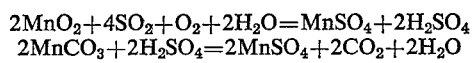

$$2MnO_2 + 4SO_2 + O_2 + 2H_2O = MnSO_4 + 2H_2SO_4$$
$$2MnCO_3 + 2H_2SO_4 = 2MnSO_4 + 2CO_2 + 2H_2O$$

The formation of the sulfuric acid may take place in conformity with other reactions too.

The waste gases of power stations can be advantageously used as the waste gases containing 0.2 to 5% by vol. of sulfur dioxide, but gases of this concentration range may be prepared also by mixing air and sulfur dioxide.

The manganese content of the manganous-sulfate solution obtained in the above-described way can be advantageously recovered by precipitating the phosphorus and iron contents of the solution by adding to the solution calcium carbonate, preferably ground limestone, separating the precipitate obtained, thereafter precipitating the manganese as manganous hydroxide with the aid of a solution containing calcium hydroxide, separating, if desired, the calcium-sulfate precipitate from the manganous hydroxide by countercurrent sedimentation, oxidizing the manganous hydroxide to manganic hydroxide, suitably by bubbling air through the solution, then drying and/or agglomerating the manganese dioxide thus obtained.

It is advantageous to carry out the drying and the agglomeration in a drum or conveyor dryer or in a fluidizing bed.

In compliance with the process according to the invention, the manganese content of the manganous-sulfate solution can be recovered also by electrolysis, after removing from the solution the impurities having a disturbing effect from the point of view of electrolysis.

If one intends to recover manganese salts, the manganous-sulfate content of the solution can be recovered by crystallization, and the manganese content of the solution can be recovered by precipitating other manganese salts from the solution.

If while precipitating the manganous hydroxide with calcium sulfate also calcium-sulfate precipitate is formed, then it is advantageous to separate the calcium sulfate from the manganous hydroxide by the aid of countercurrent sedimentation. If, however, the manganous hydroxide is precipitated with a solution containing the calcium hydroxide in a small concentration so that no calcium-sulfate precipitate is formed, then the separation of the manganous hydroxide and calcium sulfate by countercourrent sedimentation is rendered superfluous and thus may be omitted.

It is suitable to use a flooding foam column as the equipment ensuring contact over large surfaces.

The process according to the invention is further illustrated by the aid of the following examples.

Example 1

From 100 kg. of an oxide barren having a manganese content of 15% and obtained by ore dressing, and from 100 kg. of a manganese carbonate ore having a manganese content of 20%, a slurry having a pulp thickness of 100 g./l. is prepared. The thus-obtained slurry is allowed to react in a flooding foam column, at a temperature of 45° C. with waste gases containing 0.4% of sulfur dioxide.

The barren content of the thus-treated slurry is separated in a sedimenting centrifuge whereby 1800 l. of a solution containing about 4.8% (about 86 kg.) of manganous sulfate are obtained. To this solution 10 kg. of ground limestone are added, whereby the pH value is adjusted to about 4, and the iron and phosphorus ions are precipitated. The solution is filtered in a vacuum filter, and the filtrate is allowed to react with 4500 l. of lime milk containing altogether 42 kg. of calcium hydroxide. As a result of this reaction, 50 kg. of manganous hydroxide are obtained. Due to the high dilution and the pH of the solution, no calcium-sulfate precipitate is formed.

Thereafter, air is bubbled through the solution whereby the manganous-hydroxide precipitate is oxidized to manganic hydroxide, and the manganic hydroxide is allowed to settle. The precipitate is filtered in a filter drum after which it is dried and agglomerated.

The thus-obtained product is an oxide mixture free of phosphorus and containing 62% of manganese, less than 1% of iron and silicon dioxide, and 3.4% of calcium oxide.

Example 2

From 36 kg. of an oxide barren obtained by ore dressing and containing 15% of manganese, and from 141 kg. of a manganese carbonate ore containing 20% of manganese, a slurry is prepared with a pulp thickness of 100 g./l. This slurry is allowed to react with waste gases containing 0.4% of sulfur dioxide in the way described in Example 1. Thereby, 1650 l. of a solution containing about 5.2% (86 kg.) of manganous sulfate are obtained. The solution is treated as described in Example 1, with the difference that the 42 kg. of calcium hydroxide are added to the solution in the form of 4650 l. of lime milk.

Example 3

From 18 kg. of an oxide barren obtained by ore dressing and containing 15% of manganese, and from 162 kg. of a manganese carbonate ore containing 20% of manganese, a slurry having a pulp thickness of 100 g./l. is prepared. The slurry is treated in the way described in Example 1. The obtained solution has a volume of 1600 l. and a manganous-sulfate content of 5.3% (86 kg.). The solution is treated in the way described in Example 1, but the 42 kg. of calcium hydroxide are added to the solution in the form of 4680 l. of lime milk.

Example 4

One proceeds as described in Example 2 but from the starting ores a slurry having a pulp density of 50 g./l. is prepared, and this slurry is allowed to react with the waste gases. The obtained solution has a volume of 3480 l. and a manganous-sulfate content of 2.6% (86 kg.). Further on one proceeds as described in Example 2 but the 42 kg. of calcium hydroxide are added to the solution in the form of 2820 l. of lime milk.

Example 5

One proceeds as described in Example 2 but from the starting ores a slurry having a pulp density of 200 g./l. is prepared, and this slurry is allowed to react with the waste gases. The obtained solution has a volume of 830 l. and a manganous-sulfate content of 10.4% (86 kg.). The 42 kg. of calcium hydroxide are added to the solution in the form of 5470 l. of lime milk.

Example 6

One proceeds as described in Example 1 but the 42 kg. of calcium hydroxide are added to the solution in the form of 500 l. of lime milk. The 50 k.g. of manganous hydroxide and 76 kg. of gypsum obtained as the reaction product are separated in countercurrent liquid fluidization equipment. The solution containing a manganous hydroxide is treated in the way described in Example 1.

Example 7

One proceeds as described in Example 2 but the manganese content of the manganous-sulfate solution is precipitated i nthe form of manganous carbonate by adding 48 kg. of sodium hydrogen carbonate in the form of an aqueous solution. The precipitate is filtered and dried at a temperature of 70° C. In this way, 68 kg. of manganous carbonate are obtained which can be advantageously used for preparing other manganese salts and which, after further purification, can be used for telecommunication purposes as well.

Example 8

The manganous-sulfate solution is prepared in the way described in Example 5, after which warm air is blown through the solution. After reaching a solution temperature of 40° C., the pH of the solution is set to a value of 6–6.2 by adding concentrated ammonium hydroxide solution. At this pH value the iron content of the solution is precipitated in the form of ferric hydroxide. After filtering, by the addition of ammonium sulfide solution, the copper, lead, cobalt and nickel ions of the solution are precipitated in the form of sulfides. The sulfide precipitates are filtered, after which the elementary sulfur is oxidized by blowing air through the solution, and the organic substances contained in the solution are separated by the addition of activated charcoal.

The pure electrolyte obtained after filtering is electrolyzed at a voltage of 4–4.2 v., with a cathodic current density of 350–500 a./m.$^2$ and an anodic current density of 900–1200 a./m.$^2$, at a temperature of about 30–35° C. In this way 30 kg. of manganese metal having a purity of 99.92 to 99.93% are obtained.

What we claim is:

1. A process for producing concentrates of high manganese content, comprising preparing an aqueous slurry by mixing substantial quantities both of finely divided manganese carbonate ores with substantial quantities of mineral raw material containing manganese oxide, contacting the slurry with gas containing about 0.2 to 5% by volume of sulfur dioxide to produce a manganous sulfate solution, separating said solution and the barren content of the slurry from each other, and recovering the manganese content from said separated solution.

References Cited

UNITED STATES PATENTS

| | | | |
|---|---|---|---|
| 1,188,705 | 6/1916 | Vadner | 204—83 |
| 1,325,129 | 12/1919 | Westling | 23—145 |
| 2,340,188 | 1/1944 | Jukkola | 75—115 |
| 2,500,039 | 3/1950 | Magoffin et al. | 23—145 |
| 3,065,155 | 11/1962 | Welsh | 204—86 |

OTHER REFERENCES

Vedensky, D. N.: "How the $SO_2$ Process Worked on Three Kids Manganese Ore," Engineering and Mining Journal, vol. 147, No. 7, pp. 58–64.

JOHN H. MACK, *Primary Examiner.*

H. M. FLOURNOY, *Assistant Examiner.*